Feb. 2, 1932.  S. THOMAS ET AL  1,843,525
FEEDING ARRANGEMENT FOR ELECTRIC DEVICES
Filed March 20, 1929
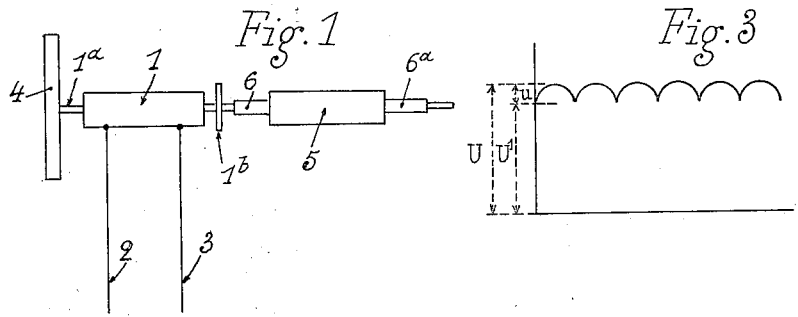
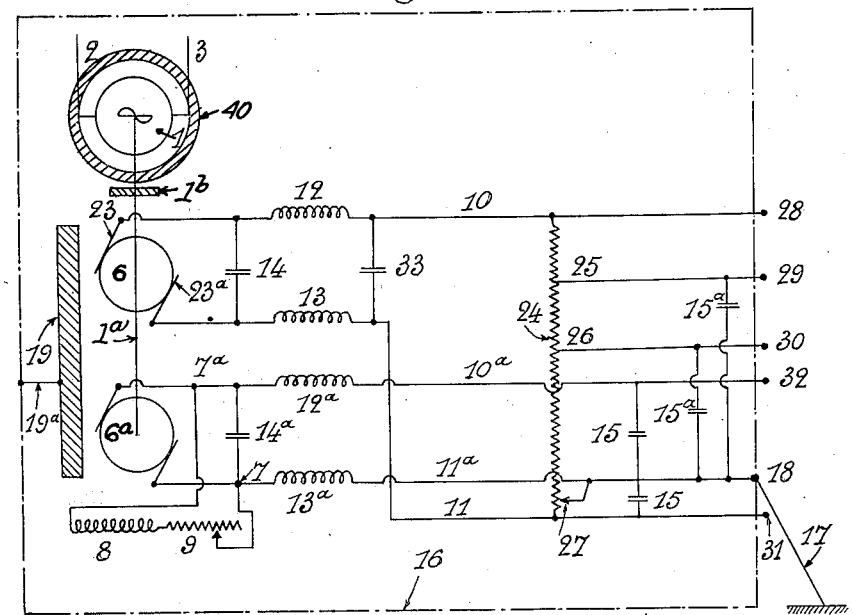
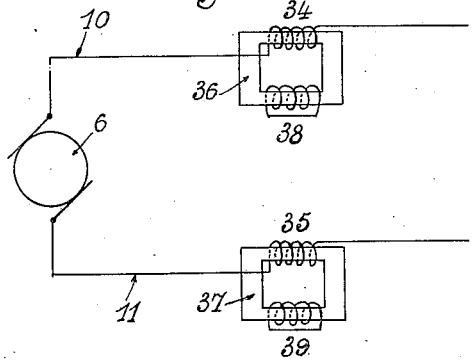
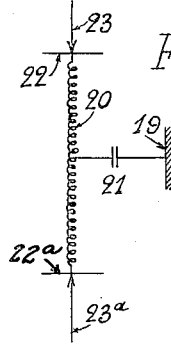
INVENTORS:
Sébastien Thomas
Maurice Théophile Robert
by
ATTORNEY Patented Feb. 2, 1932

1,843,525

UNITED STATES PATENT OFFICE

SEBASTIEN THOMAS AND MAURICE THEOPHILE ROBERT, OF PARIS, FRANCE

FEEDING ARRANGEMENT FOR ELECTRIC DEVICES

Application filed March 20, 1929, Serial No. 348,620, and in France July 25, 1928.

The present invention relates to feeding arrangements for electric devices, and more particularly, to feeding unit for supplying constant direct current to a radiophonic receiver.

Up to the present time, the feeding, in wireless stations for radio-telegraphy or radio-telephony or distant vision, of the tubes containing rare gas, and the like, by means of the current supplied from the consumer's main could not be carried out with satisfactory results because said tubes require a strictly constant current.

The supply mains or like sources of direct current are not directly available for this purpose, by reason of the tension or voltage variations due to peaks in the load or switching and also to the parasitic currents issuing from the commutators of the D. C. generators in the central station, or from the commutators of the consumer's own generator.

Attempts have been made to use the current from A. C. supply mains, after being rectified; however such arrangements have not proved satisfactory, since, in addition to the abrupt variations of tension or voltage which are obviously transmitted through the rectifier to the rectified current, the latter is also affected by parasitic currents of a periodic nature, that is harmonic currents. These latter may be generated either in the transformers (third harmonic of three-phase transformers), or in the A. C. generators of the central station since the filters associated with the rectifiers can only stop a limited number of harmonics.

Furthermore, the operation of a motor located at a small distance from the receiver set, such as motors of vacuum cleaner, refrigerating plant, lift, etc. . . . , will prevent the proper reception, due to the parasitic waves which are produced thereby.

The invention has for its object to provide a unit for feeding direct current to a radiophonic set receiver, said unit being fed by means of the supply main, thus dispensing with the troublesome use of storage batteries, another object of the invention is to cut off any connection between the main and the circuit of said radiophonic set receiver through which parasitic currents or waves would be liable to pass and thus impress the receiver.

Further objects and advantages of the invention will now be described, with reference to the accompanying drawings, which are given solely by way of example, and in which:

Fig. 1 is a diagrammatic view of a motor-generator unit according to the invention.

Fig. 2 is a diagram of the electric connections (for the sake of clearness, the motor and the commutators are shown in end view).

Fig. 3 is a diagram howing the variations of tension or voltage of the current of the D. C. generator.

Fig. 4 is a diagrammatic view showing how a commutator is liable to operate as a wave emitting antenna.

Fig. 5 shows diagrammatically a modification of the device for smoothing or damping the voltage or tension variations of a D. C. generator, a single commutator being shown in this figure.

With reference to the diagrammatic Figures 1 and 2, the feeding unit according to the invention comprises an electric motor 1 which is fed with direct or alternating current by the lines 2—3 of the main.

Said motor is coupled with a shunt-wound D. C. generator 5 which comprises two commutators 6—6$^a$ corresponding to two separate windings (not shown) adapted to produce current at two different tensions or voltages. respectively. To the low-tension commutator 6$^a$ at 7, 7$^a$ is shunted a circuit comprising the field coil 8 of the generator and a rheostat 9 (Fig. 2).

On the shaft 1$^a$ of the said motor is mounted a centrifugal governor 4 (Fig. 1).

Each commutator 6—6$a$ is inserted in a circuit comprising two conductors 10,11—10$^a$, 11$^a$ leading to terminals 28, 31—32, 18 respectively and acting as four waves emitting antennas. The two windings of the generator are so disposed as to furnish D. C. current having respective voltages or tensions $V_1$ and $V_2$, (for instance 160 volts and 4 volts). The tension $V_1$ applied to the plate circuit of the radio-phonic receiving set, and the tension $V_2$ is used to heat the filaments. The electric connections within the receiving set have not been illustrated, since they are well known in the art.

The arrangement further comprises a series of inductances and condensers whose purpose will be further specified. In the circuit of each commutator is mounted a damping or smoothing system consisting of two inductances 12—13, 12ª—13ª respectively, in series with the conductors 10—11, 10ª—11ª, and two condensers, 14—14ª shunted between the brushes of the corresponding commutator. The inductances 12—13—12ª—13ª are preferably made of several superposed layers of magnetic wire, such as iron, nickel or the like, so as to provide a permeable medium for the magnetic field. For any given layer the section of the magnetic circuit is increased by the section of the underlying layers of iron wire, whereby the cross section of the iron increases in proportion to the number of wire layers. In this manner inductances are provided which possess a considerable self-induction in a comparatively small volume.

In order to prevent the transmission of high frequency waves along the leads, the conductors 10a and 11 are connected by means of condensers 15 with the conductor 11a, whose terminal (the negative terminal of the 4 volts circuit) is earthed by a conductor 17 of negligible inductance. Condensers 15 have a large capacity relatively to the capacity of the system conductors 10, 11—earth. Similarly, conductor 10 is earthed through the medium of a condenser 33, conductor 11, condenser 15, conductor 11a, terminal 18 and conductor 17.

The generator 5, the motor 1, the condensers 14, 14a, 15, 33 and the inductances 12, 13, 12a, 13a are disposed within a Faraday's cage 16 consisting for example of a box of magnetic metal, in order to prevent the direct transmission of the waves emitted at the brushes through the air. Said cage 16 is connected electrically with the terminal 18 earthed by the conductor 17.

In this manner, the four waves emitting antennas, constituted by the conductors 10, 11, 10ª, 11ª, are short-circuited and the static charges from the terminal 18 or from the cage 16 are discharged through the earth wire 17.

In spite of the above arrangements, the alternating current from the main, or its harmonics, is liable to pass from the motor winding to the metallic parts thereof due to the large capacity of the system winding-metallic parts of the motor, thence to the metallic parts of the generator, through the motor shaft 1ª or through the cage 16, and finally to the windings of the latter, due to the large capacity of the system winding-metallic parts of the generator. To prevent this, the motor 1 is insulated from the cage 16 by a base of insulating material 40, and its shaft 1ª is electrically insulated from the shaft of the generator 5 by means of an insulating coupling 1ᵇ. In this manner, the passage of the alternating current from the main to the generator circuits through the capacities is efficiently prevented.

The metallic parts of the generator 5 (diagrammatically represented by the sectioned rectangle 19 in Fig. 2) are connected to the cage 16 by a conductor 19ª and are hence in electric connection with terminal 18 and earth through the wire 17.

It will be seen that the elimination of all direct electric connections between the main and the radiophonic set, and of any possible communication by capacity with the said main, will permit of efficiently preventing the transmission of parasitic currents from the main or the generator 5 into the current produced by said generator 5.

The tensions $V_1$ and $V_2$ at the terminals of the two circuits are thus quite unaffected by the voltage or tension variations in the main. Moreover, the motor speed is kept constant by the provison of governor 4, in the case of a D. C. motor provided with a commutator, or, in the case of an A. C. single-phase motor, the speed is naturally constant since it depends solely upon the constant frequency of the alternating current supplied by the main.

In spite of this regularity, the tensions $V_1$ $V_2$ are not constant; it is well known that the tension at the terminals of a D. C. generator with commutator is periodically variable and may be represented by an undulated curve, as shown in Fig. 3. The tension $V_1$ or $V_2$ varies between a maximum U and a minimum $U_1$; the difference $u=U-U_1$ representing said variation is not compatible with the proper reproduction of the sound.

Such variations are eliminated from each circuit by the damping or smoothing arrangement consisting of the condensers 14—14ª and the inductances 12—13, 12ª—13ª, associated with the conductors 10—11, 10ª—11ª. Due to this arrangement, the current supplying the radiophonic set will be constant.

Referring now to diagrammatic Fig. 4, 20 denotes the half of a winding of generator 5, supposedly developed on the plane of the figure, 22, 22ª two commutator segments 23, 23ª two brushes cooperating with said commutator segments, and 19 the adjacent portion of the metallic parts of the generator 5. The system comprising said winding 20 and the body of metallic parts 19 possesses a certain capacity, represented diagrammatically by a condenser 21. Said capacity being quite large, arcs are formed between the commutator segments 22, 22ª and the brushes 23, 23ª when the segments pass below the brushes. Now, if the metallic body 19 of the generator 5 is earthed, each conductor 10—11, 10ª—11ª will operate as a wave emitting antenna, thus forming two wave transmitting stations for each commutator. Even if the body 19 of the generator is not earthed, the result will be the same, each wire forming an electric balance for the other.

The high and low frequency waves thus generated in the generator circuits will be transmitted to the radiophonic set receiver, both directly through the air and through the conductors 10—11 and 10ª—11ª.

In fact, the propagation of the low-frequency waves along the conductors is prevented by the inductances 12—13, 12ª—13ª. However, since the capacity between the intake and the output of the said inductances is not negligible, the high-frequency waves would have a tendency to pass through such coils. However, this is prevented in the present arrangement, due to the provision of condensers 15 and 33 which connect conductors 10ª, 11 and 10 to the terminal 18 and thus to the body 19 of the generator. In this manner, the four wave emitting systems above referred to are short-circuited and the static charges from the terminal 18 or from the Faraday cage 16 are discharged through the earth wire 17.

The direct propagation of the waves through the air is thus prevented by the Faraday cage 16.

From the foregoing, it will be seen that the arrangement above described will permit to eliminate all waves produced by the commutators of the generator. As above stated, if the motor is provided with a commutator, it will be disposed in the Faraday's cage.

If the main supplies alternating current, it is preferable to use a single-phase squirrel-cage motor; which has the advantage of being deprived of commutator, thus obviating the inherent difficulties above set forth, unavoidable with a D. C. generator. Such a motor will be mounted on an insulated base and will be insulated from the generator by an insulating coupling joint.

For the feeding of a radiophonic receiver, the above described arrangement may be associated for example with a potentiometer 24 having two fixed intermediate terminals 25—26 and a sliding contact 27, thus providing for five different tensions or five voltages, for example as follows: 1° between terminal 18 (which is earthed by wire 17) and terminal 28, a tension or voltage of 160 volts; 2° between terminals 18 and 29, 80 volts; 3° between terminals 18 and 30: 40 volts; 4° between terminals 18 and 31: from 0 to 25 volts; 5° between terminals 18 and 32: 4 volts.

The first three tensions or voltages may be utilized as plate tensions for the lamp of a radiophonic set, the fourth may be used as grid polarizing tension or voltage, and the last tension for the heating of the filament. The branch wires 25—29 and 26—30 of the potentiometer are earthed through the medium of condensers 15ª, having the same function as the condensers 15 above described.

It will be noted that, since the tension or voltage $V_1$ is to be used as plate tension, condenser 33, in addition to its function of antenna short-circuiting capacity (relatively to conductor 10), will allow the passage of currents of audible frequency, which would not pass beyond the inductances 12—13.

In the modification shown in Figure 5, the conductors 10 and 11 which are connected with commutator 6, are coiled at 34—35 around one longitudinal side of soft rectangular iron frames 36—37. The said frames carry upon their opposite longitudinal side respective closed windings 38—39. The same arrangement may obviously be provided in connection with conductors 10ª, 11ª. This arrangement will improve the damping or smoothing effect of the inductances 12—13 and condensers 14, 33, since any variation in the E. M. F. of the generator, and hence in the tension or voltage applied to the windings 34—35, will produce a variation of magnetic flux in the iron frames 36—37; thus producing losses of energy by hysteresis and inducing eddy currents, in the windings 38, 39. These eddy currents will in turn absorb the energy corresponding to the tension or voltage variation in the inductance, due to the transformation of such energy into heat.

Obviously, the said invention is not limited to the arrangements herein described and represented, which are given solely by way of example.

Having now described our invention what we claim as new and desire to secure by Letters Patent is:

1. A feeding unit for supplying constant direct current to a radiophonic receiver comprising in combination a metal shield, a motor and direct current generator set within said metal shield, electric circuits to be supplied with current from said set, means in said circuits for opposing tension variations therein, and condensers for connecting the conductors of said circuits to said metal shield, said condensers having great capacities relatively to the capacity of said conductors with reference to said metal shield.

2. A feeding unit for supplying constant direct current to a radiophonic receiver comprising in combination a metal shield, a motor to be supplied from the main, within said shield, means for insulating said motor from the earth, a D. C. generator having several windings and commutators, and disposed within said shield, an insulating coupling between said motor and said generator, means for earthing the metallic masses of said generator, electric circuits electrically connected with said commutators, respectively, means in said circuits for opposing tension variations therein, and condensers for connecting the conductors of said circuits to said metal shield.

3. A feeding unit for supplying constant direct current to a radiophonic receiver comprising in combination a metal shield, a motor and direct current generator set within said metal shield, electric circuits to be supplied with current from said set, means in said circuits for opposing tension variations therein, embodying choke coils, each having a number of superposed coils of magnetic wire, and condensers for connecting the conductors of said circuits to said metal shield, said condensers having great capacities relatively to the capacity of said conductors with reference to said metal shield.

4. A feeding unit for supplying constant direct current to a radiophonic receiver comprising in combination a metal shield, a motor and direct current generator set within said metal shield, electric circuits to be supplied with current from said set, means in said circuits for opposing tension variations therein, embodying choke coils, each having a soft iron core and a closed electric circuit surrounding said core, and condensers for connecting the conductors of said circuits to said metal shield, said condensers having great capacities relatively to the capacity of said conductors with reference to said metal shield.

In testimony whereof we have signed our names to this specification.

SEBASTIEN THOMAS.
MAURICE THEOPHILE ROBERT.